US010374425B2

(12) United States Patent
Quadrini

(10) Patent No.: US 10,374,425 B2
(45) Date of Patent: *Aug. 6, 2019

(54) METHOD AND A DEVICE FOR BALANCING ELECTRIC CONSUMPTION

(71) Applicant: Roberto Quadrini, Villasanta (IT)

(72) Inventor: Roberto Quadrini, Villasanta (IT)

( * ) Notice: Subject to any disclaimer, the term of this patent is extended or adjusted under 35 U.S.C. 154(b) by 0 days.

This patent is subject to a terminal disclaimer.

(21) Appl. No.: 15/937,404

(22) Filed: Mar. 27, 2018

(65) Prior Publication Data

US 2018/0219375 A1 Aug. 2, 2018

Related U.S. Application Data

(63) Continuation of application No. 14/907,453, filed as application No. PCT/IB2014/001374 on Jul. 22, 2014, now Pat. No. 9,991,705.

(30) Foreign Application Priority Data

Jul. 29, 2013 (IT) .............................. RE2013A0056

(51) Int. Cl.

| | |
|---|---|
| ***H02J 3/00*** | (2006.01) |
| ***H02J 3/24*** | (2006.01) |
| ***G05B 13/04*** | (2006.01) |

(52) U.S. Cl.

CPC .............. *H02J 3/00* (2013.01); *G05B 13/041* (2013.01); *H02J 3/24* (2013.01); *H02J 2003/007* (2013.01); *Y02E 60/76* (2013.01); *Y04S 40/22* (2013.01)

(58) Field of Classification Search

CPC .......... H02J 3/00; H02J 3/24; H02J 2003/007; G05B 13/041; Y04S 40/22; Y02E 60/76

See application file for complete search history.

(56) References Cited

U.S. PATENT DOCUMENTS

| | | | |
|---|---|---|---|
| 5,671,403 A | 9/1997 | Shekita et al. | |
| 6,609,048 B2 | 8/2003 | Matsuo et al. | |
| 8,116,916 B1 | 2/2012 | Zeanah et al. | |
| 8,145,361 B2 | 3/2012 | Forbes, Jr. et al. | |
| 9,031,703 B2 | 5/2015 | Nakamura et al. | |
| 9,991,705 B2 * | 6/2018 | Quadrini .................. | H02J 3/24 |

(Continued)

FOREIGN PATENT DOCUMENTS

| | | |
|---|---|---|
| JP | 2002369385 A | 12/2002 |
| WO | 2008071995 A2 | 6/2008 |

*Primary Examiner* — Charles R Kasenge

(74) *Attorney, Agent, or Firm* — Volpe and Koenig, P.C.

(57) ABSTRACT

A method for balancing electric consumption generated by a plurality of electric loads includes: estimating an absorbed energy ($E_k$) by the loads in a predetermined time interval, and if a value of the estimation of absorbed energy by the loads is not within an interval defined by a minimum and a maximum consumption threshold, calculating a quantity of energy to be varied in accordance with a difference between the value of the estimation of the absorbed energy and an expected value of energy, determining a strategy comprising at least an action to be carried out to vary the energy supplied to the single loads, with an aim of reducing the difference between the estimated absorbed energy and the expected value thereof, actuating a scheduling of electric consumption in accordance with a determined strategy.

10 Claims, 7 Drawing Sheets

(56) References Cited

U.S. PATENT DOCUMENTS

| | | | | |
|---|---|---|---|---|
| 2003/0045969 | A1* | 3/2003 | Matsuo .................. | G06Q 50/06 700/291 |
| 2005/0210304 | A1 | 9/2005 | Hartung et al. | |
| 2010/0138363 | A1 | 6/2010 | Batterberry et al. | |
| 2010/0198713 | A1 | 8/2010 | Forbes, Jr. et al. | |
| 2010/0222934 | A1* | 9/2010 | Iino ........................ | G06Q 10/06 700/291 |
| 2012/0059528 | A1 | 3/2012 | Umesawa et al. | |
| 2012/0065792 | A1 | 3/2012 | Yonezawa et al. | |
| 2012/0083927 | A1 | 4/2012 | Nakamura et al. | |

* cited by examiner

METHOD AND A DEVICE FOR BALANCING ELECTRIC CONSUMPTION

INCORPORATION BY REFERENCE

This application is a Continuation of U.S. Ser. No. 14/907,453, filed Jan. 25, 2016, which is a § 371 National Phase of PCT/IB2014/001374, filed Jul. 22, 2014, the entire contents of all of which are incorporated by reference herein as if fully set forth.

TECHNICAL FILED

The present invention relates to a method and a device for balancing electric consumption.

BACKGROUND

As is known, in the liberalized energy market energy supply contracts can be stipulated, for example managed by market operators, which define a quantity of energy supplied within determined time intervals, for example on an hourly basis.

However, it can occur that owing to various phenomena, such as particular scheduling the electric loads or manual actuations of the users or other, the total system of loads can be brought as a consequence to absorb a greater or lesser quantity of energy with respect to the energy forecast and allocated by the market operator.

In both cases the maximum or minimum thresholds of the energy allocation might be exceeded; when this happens there is a positive imbalance with an excess of consumption or a negative imbalance with an excessively low consumption with respect to the ordered allocation, which leads to increases in price for the energy and/or significant penalties.

SUMMARY

An aim of the present invention is to obviate the above-mentioned drawbacks, by predisposing actions on the electric loads which enable maintaining or returning the system internally of the agreed consumption thresholds of the above-mentioned while at the same time limiting the impact of these actions on the comfort perceived by the people using the system.

A further aim of the invention is to attain the above result in a way that is practical and economical.

The aims are attained by a method for balancing electric consumption generated by a plurality of electric loads, the method comprising following steps:

- estimating an absorbed energy in a predetermined time interval, and
- if a value of the estimation of absorbed energy by the loads is not within an interval defined by a minimum and a maximum consumption threshold,
- calculating a quantity of energy to be varied in accordance with a difference between the value of the estimation of the absorbed energy and an expected value of energy,
- determining a strategy comprising at least an action to be carried out to vary the energy supplied to the single loads, with an aim of reducing the difference between the estimated absorbed energy and the expected value thereof,
- actuating a scheduling of electric consumption in accordance with a determined strategy.

Among the advantages of this embodiment of the invention is the fact that it is able to return internally of a predetermined threshold of electric consumption a system which for some reason had been subject to an imbalance from the energy point of view.

This can enable avoiding penalties if a system were to consume too much or too little with respect to what is set out in an electricity supply contract.

The method of the invention is also able to adapt to all real cases in which the minimum and maximum thresholds for consumption are variable over time, for example in accordance with the time bands.

The method of the invention further exhibits a broad applicability as it can be applied not only to loads downstream of a point of distribution of the energy, but also for balancing sub-systems of a domain operating on the single areas thereof.

The energy-balancing method of the invention can also be applied upstream of the points of distribution of the energy and in particular can be applied to the balancing not only of consumptions, but also balancing of the energy supply by different electricity distributors internally of a same distribution network.

A further embodiment of the invention also comprises a device for balancing electric consumption generated by a plurality of electric loads, the device comprising:

- means for estimating an absorbed energy by the loads in a predetermined time interval,
- means for comparing the absorbed energy ($E_k$) by the loads with a minimum threshold and a maximum load of consumption,
- means for calculating a quantity of energy to be varied in accordance with a difference between the value of the estimation of the absorbed energy and an expected value of energy,
- means for determining a strategy comprising at least an action to be carried out to vary the energy supplied to the single loads, with an aim of reducing the difference between the estimated absorbed energy and the expected value thereof,
- means for actuating a scheduling of electric consumption in accordance with a determined strategy.

Further characteristics of the invention can be deduced from the dependent claims.

BRIEF DESCRIPTION OF THE DRAWINGS

Further characteristics and advantages of the invention will emerge from a reading of the following description, provided by way of non-limiting example, with the aid of the figures illustrated in the accompanying tables, in which.

DETAILED DESCRIPTION OF THE PREFERRED EMBODIMENTS

Figure 1:
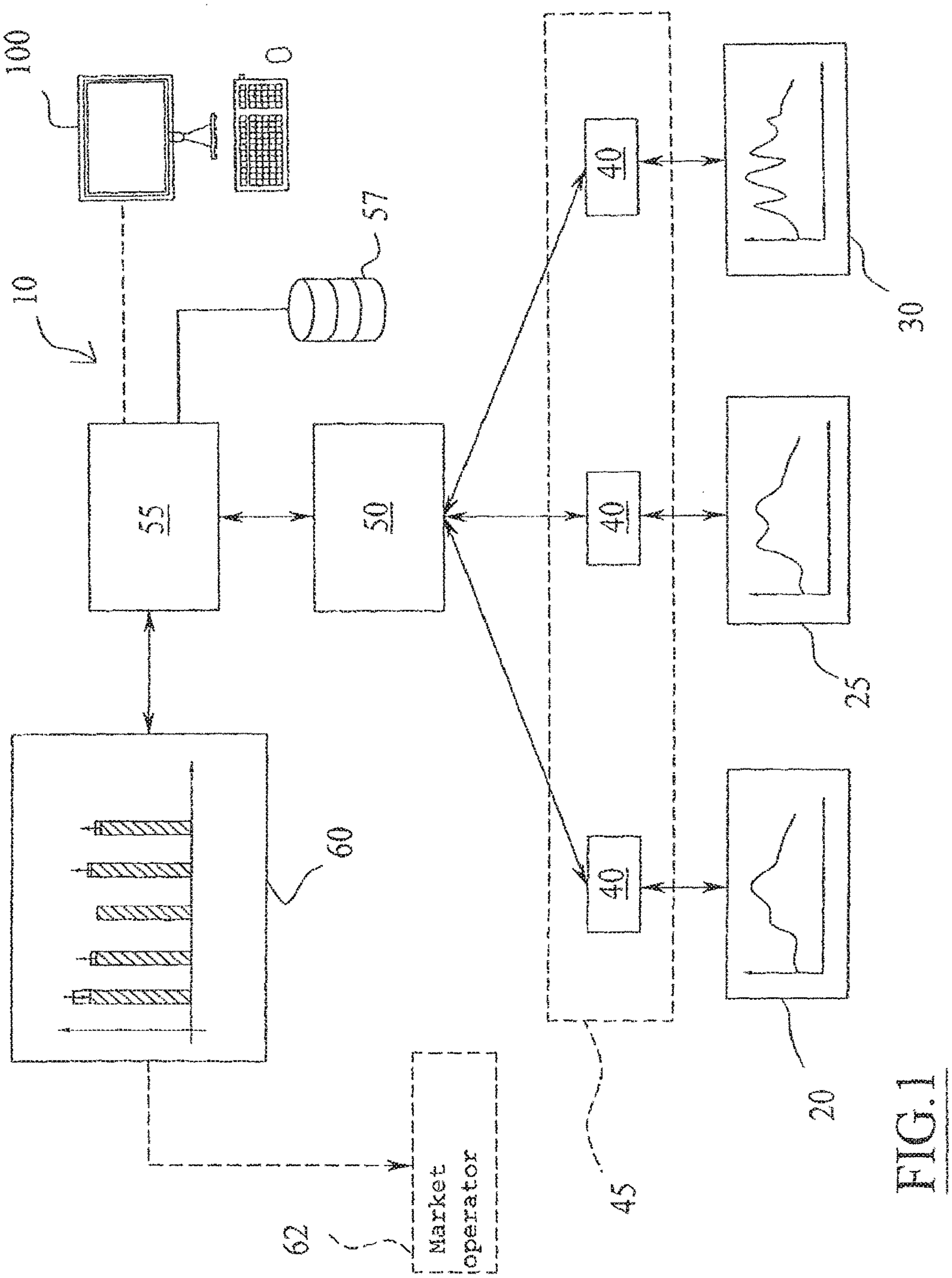
FIG. 1 illustrates a diagram of the main components of the device according to an embodiment of the invention.

FIG. 1 illustrates a diagram of the main components of the device according to a realization of the invention.

The device, denoted in its entirety by numerical reference 10, is able to monitor the electrical consumption not only in aggregate terms, but also and especially per single electric socket.

In particular, according to the applications to which the device 10 is destined, electrical consumption due to loads such as conditioning, illumination, activation of machines can be monitored, in industrial contexts and in general for each electrical load connected to the network.

In general, for each electrical load there will be a different time progression of the electric consumption, such as for example represented in blocks 20, 25 and 30.

Each of the electrical loads can be monitored via an interface 40 provided with sensors which measures the electrical parameters of the load directly on the single electrical sockets, for example current, tension, active power, reactive power, apparent power, active energy, reactive energy, apparent energy. These measurements can be carried out in precision classes 0.2 and 0.5.

The totality of the interfaces 40 forms a power sub-system 45.

The power sub-system 45 not only carries out the measurements of the loads, but also provides electrical supply to the loads directly connected thereto.

In this way, in a case of energy balancing, the power sub-system 45 can intervene on electric loads selectively, as a result of the calculations of the balance algorithm illustrated in the following part of the present description.

In particular, the power sub-system 45 also has the function of controlling the electrical load by means of, for example, switching on and off, partializing the load, managing alarms, security measures, stand-by killers, management of electrical peaks, control of time changes and each 15 minutes relating to the contractual power used defined in the contract with the supplier of electrical energy, memorization, in definable time periods, of the energy consumption of every single electrical socket, memorization of the emission of carbon dioxide and others besides.

The power sub-system 45 is connected, by means of a serial interface sub-system 50, or another type of connection for data transmission, including wireless, to a monitoring sub-system 55 where the data of the electrical consumption of each load is memorized, with the aim of constructing a database 57 of the data.

Firstly, as it is possible to monitor the single electrical loads, thanks to the system 10 described above, it is also possible to classify the electrical consumption by sub-dividing it into areas of consumption following criteria of homogeneity.

For example, an area can be constituted by a floor of a public structure, such as a hospital, with its consumption in terms of lighting, conditioning, heating, or it can be constituted by a machine in a production plant of a company or by a group of machines of a same type, or even by using other criteria of similarity or homogeneity.

The identification of the areas defined in this way enables constructing groups of areas which have in common a same use destination or which belong to a same user of the electrical service; these are defined as domains.

Non-limiting examples of domains, for which the various embodiments of the invention can be applied, can be: a hospital, a steelworks or a winery, each of which domains has specific needs in terms of electrical consumption.

A domain can be sub-divided into various groups or clusters, i.e. which collect in each group a specific type of data representing the electrical consumption such as to create significant sub-divisions of the electrical consumption.

By way of example, by means of the above-mentioned profiling operations two types of consumption can be identified, each associated to a specific group (or cluster) of data, i.e. to a first group of data representing electrical consumption due to essential services and in a second group of data representing electrical consumption due to activities of a discontinuous nature, such as for example productive activities.

Table 1 below summarizes the concepts of areas, clusters and domains:

TABLE 1

| Domain | Services | Production |
|---|---|---|
| Hospital | Lighting, HVAC, UTA, etc.. | Hospital machines e.g. CT scanners, PET, etc. |
| Steelworks | Lighting, HVAC, UTA, etc.. | Furnace, high-intensity machines with high electrical consumption. |
| Winery | Lighting, HVAC, UTA, etc. | Wine production machines. |

Following these operations, it can be seen that the essential services generate substantially constant electrical consumption and the load groups, due to productive activities, generate consumptions that vary over time.

With the data gathered in this way controls are carried out on the progression of the consumption trend, verifying that the quantity of electric energy absorbed by all the plants and the devices forecast for within the hour, while maintaining the power, is comprised within the availability of hourly energy defined by the market operator as a load profile interval on an hourly basis.

As better illustrated in the following, the system of the invention is able to perform balancing operations of the electric loads, operations managed by a respective module 60, in a case in which the above-described conditions do not obtain.

The balancing module 60 manages the energy imbalance, i.e. its task it to analyze consumption and, according to the differences between effective consumption and allocated consumption, apply a combining optimization so as to select the steps to be taken to modify the present scheduling and compensate any imbalance that might occur.

In a preferred embodiment of the present invention, the balancing algorithm can be operated by sub-dividing the hours of the day into 15 minute periods, with the understanding that this subdivision is illustrated herein by way of non-limiting example of the possible time sub-divisions of the balancing algorithm.

Further, for reasons of simplicity, in the present description of the balancing algorithm reference is made to the concept of electric load, while its being understood that the balancing can be made in single areas too, i.e. it is possible to manage the balancing of a domain by means of correction in the single areas, as well as its being possible to operate so as to balance a sub-set of a domain, i.e. one or more clusters, by operating on only the areas belonging to that sub-set.

Therefore, in a situation of a quantity of energy to be recuperated or consumed caused by the forecast imbalance it is necessary to find a set of actions which modify consumption in the time remaining at the end of the hour in such a way as to be within the hourly energy budget, thus limiting the impact on comfort.

A further constraint, optional, is the observance of consumption thresholds for the single loads about the forecast consumption of the set scheduling. This constraint also helps to understand whether the imbalance is due to a bad definition of the loads or to an external intervention.

The actions effectible on the electric devices can be ordered in a list in which there is indicated also a reduction of the energy obtainable and the impact this has on the comfort perceived by the users, which is defined in terms of priority.

In other words, to high priorities correspond actions which strongly impact on the perceived comfort, while to low priorities correspond expendable or modifiable loads without creating discomfort to the users occupying the structures or the buildings of interest.

By way of example, some of the factors influencing the priority of actions are:

- evaluation of the user, i.e. impact on comfort and utility;
- type of load or area;
- component of the consumption profile on which the load or area will impact, i.e. modulated or substantially constant profile of the consumptions;
- imbalance of a single load;
- other identifiers associated to areas.

The problem under discussion therefore reduces down to a problem of optimization with the aim of minimizing the sum of the priorities of the actions undertaken:

$$\min \Sigma_{i=0}^{N} X_i * \text{Priority}[Vr_i]$$

setting the constraint that the sum of the variations of energy of the actions selected to intervene on the system to be balanced is able to compensate the imbalancing internally of the h-th hour.

$$|\Sigma_{i=0}^{N} X_i * Vr_{i,j}| \leq |\Delta_h|$$

and $$\Delta_h + \Sigma_{i=0}^{N} X_i * Vr_{i,j} \leq \text{margin}_h$$

where:

N identifies the number of actions available;

$X_i$ is the binary vector [1, N] which identifies the chosen strategy, i.e. expressed as a selection of the i-th actions to be used, $Vr_i$ indicates the variation of energy obtainable by the i-th action, the priority $[Vr_i]$ indicates the priority of the i-th action, j (with j=4−k) indicates the number of quarter-hours remaining in a determined hour, Δh is the quantity of energy to be recuperated or to be consumed, according to individual cases, within the end of the h-th hour, so as to compensate for the imbalance, $\text{margin}_h$ is a degree of tolerance used as a stop condition of the algorithm and is representative of the maximum acceptable difference between the effects of the strategy and the energy to be varied either in excess or defect.

Figure 2:
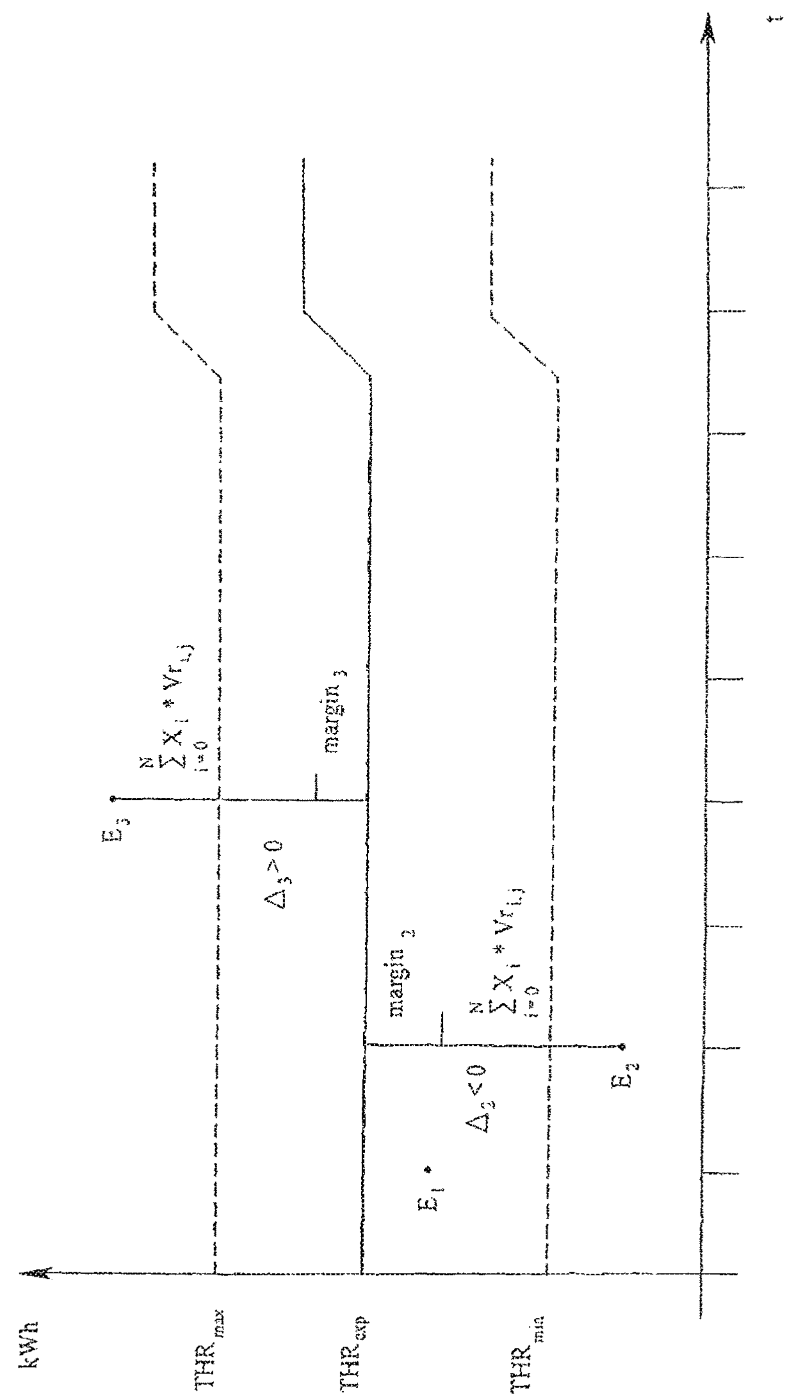
FIG. 2 illustrates some cases by way of example of the application of a realization of the invention.

FIG. 2 represents come cases by way of example in the interest of better clarifying the symbology used.

In a first case, the estimation of the energy absorbed by system $E_1$ is within the thresholds fixed by the market operator, i.e. is lower than a maximum threshold $THR_{max}$ and higher than a minimum threshold $THR_{min}$. The system therefore does not require balancing actions.

In a second case, the estimated energy absorbed $E_2$ is lower than the minimum threshold $THR_{min}$. The term $\Delta_h$ indicates the difference between the estimated absorbed energy $E_2$ and an expected value $THR_{exp}$ thereof and in this case the following is true: $\Delta_h<0$. To balance the system it is therefore necessary to increase the energy consumption. This can be done by determining a strategy to be actuated so as to vary the energy supplied to the single loads expressed by the formula $\Sigma_{i=0}^{N} X_i * Vr_{i,j}$. The term $\text{margin}_2$ indicates the maximum variation acceptable between the effects of the strategy and the effective energy to be recuperated or to be consumed.

In a third case, the established energy absorbed $E_3$ is greater than the minimum threshold $THR_{max}$. In this case the difference between the estimated absorbed energy $E_2$ and an expected value $THR_{exp}$ thereof is expressed by the condition $\Delta_h>0$. To balance the system it is therefore necessary to reduce the energy consumption.

In general the thresholds $THR_{min}$, $THR_{max}$ and $THR_{exp}$ can vary over time and their value, as a function of the time interval of interest, is memorized in the database 57.

Naturally the above-illustrated strategy will be detailed in the following of the present description by way of non-limiting example of the balancing energy strategy of the present invention.

As the selection of an action is defined in binary terms (1 action selected, 0 action rejected), the search for the more appropriate balancing actions, which can therefore give rise to a suitable scheduling of the balancing, can be interpreted as a problem of binary combinatory optimatiszation.

This problem is similar to the combinatory problem known as the knapsack problem, i.e. given a knapsack which can support a determined weight and, further, given N objects, each of which is characterized by a weight and a value, the problem presented is that of selecting which of these objects can be placed in the knapsack so as to obtain the greatest value without exceeding the weight that can be supported by the knapsack. This type of problem belongs to the area of NP-complete problems, i.e. problems the complexity of which is such that no algorithm has yet been found to solve them in a polynomial time.

Thus, considering the quantity of variable and the limited calculation time for solving (for practical ends) this problem, it is preferred to perform a progressive filtering of the possibilities selected from among the available actions for reducing the calculating complexity, then to calculate a possible strategy, i.e. a set of actions to be implemented, not necessarily optimal but in any case acceptable for practical reasons, using a Greedy heuristic.

In general, a Greedy algorithm selects, at each iteration, the element which, at that step, is most advantageous without taking account of the overall structure of the solution.

A further constraint of the problem, this time of a technical type, is the impossibility of using a plurality of actions in the same quarter-hour which influence on the same load variables in the same actuation.

A further optional control is performed to check that the selected actions compensate for any imbalanced single loads ID, such as to modify the normal scheduling as little as possible.

That is, it is necessary to evaluate whether the selections made also solve any problems of the single loads, i.e:

$$|\Sigma_{i=0}^{N} X_{ID,i} * Vr_{ID,i,j}| \leq \Delta_{ID,h}|$$

$$\Delta_{ID,h} + \Sigma_{i=0}^{N} X_{ID,i} * Vr_{ID,i,j} \leq \text{LoadMargin}_{ID,h}$$

where the variations $Vr_{ID,i,j}$ are those associated to the imbalanced loads for each time interval j, and $\Delta_{ID,h}$ is the quantity of energy to be recuperate or consumed for each single load, according to cases, within the end of the h-th hour, to compensate for the imbalance, which quantity is calculated by means of the formula:

$$\Delta_{ID,h}\ [\text{Wh}] = (E_{ID,i} - \text{LoadTHR}_{ID,k,exp}) * [(4-k)+1]$$

In the above-reported formulae, the vector $X_{ID,i}$ is the binary vector Xi with only the elements operating on the imbalanced loads ID.

The value $LoadMargin_{ID,h}$ is a margin of tolerance which indicates the maximum variation acceptable between the effects of the strategy and the effective energy to be recuperated or consumed for the load ID and for the hour h and represents a percentage of the interval defined by the expected value of the consumption and the minimum or maximum threshold (depending on the sign of the quantity to be recuperated).

The variable $E_{ID,h}$ represents the estimation of the energy absorbed by each single load and the variable Load $THR_{ID,k,exp}$ of the expected consumption for each single load.

A check on the consumptions of the single loads is also effected in the case in which no imbalance of the total consumption obtains with respect to those predicted.

The action to be undertaken in these cases can be selected by the user (control on the consumption interval or limitation to upper or lower threshold), which action can consist only in signalling the anomaly (therefore the inaccuracy of the forecast of the particular load, or the faulting connection of the system) or the actuation of compensating actions to limit the consumption of the load to the forecast consumption.

At each implementation of the algorithm a preliminary analysis is made where an evaluation is also made of whether the present scheduling is original or already modified, for example by a preceding intervention of the algorithm.

If the current scheduling has already been modified by the balancing algorithm, the balancing module 60 also evaluates whether the progression of selection previously taken is giving the programmed effects. It this is not verified, the balancing module 60 generates a new strategy to oppose the imbalancing in the time remaining up to the end of the hour.

Given that in the proposed algorithm the measurements are made each quarter of an hour, with the number of quarter-hours defined as k=0, 1, 2, 3, and the schedulings are determined at the start of the hour, the first measurement will belong the measurement of the preceding scheduling. This makes the first quarter of an hour unusable for the managing algorithm of the imbalancing, but useful for generating an analysis report.

Figure 3:
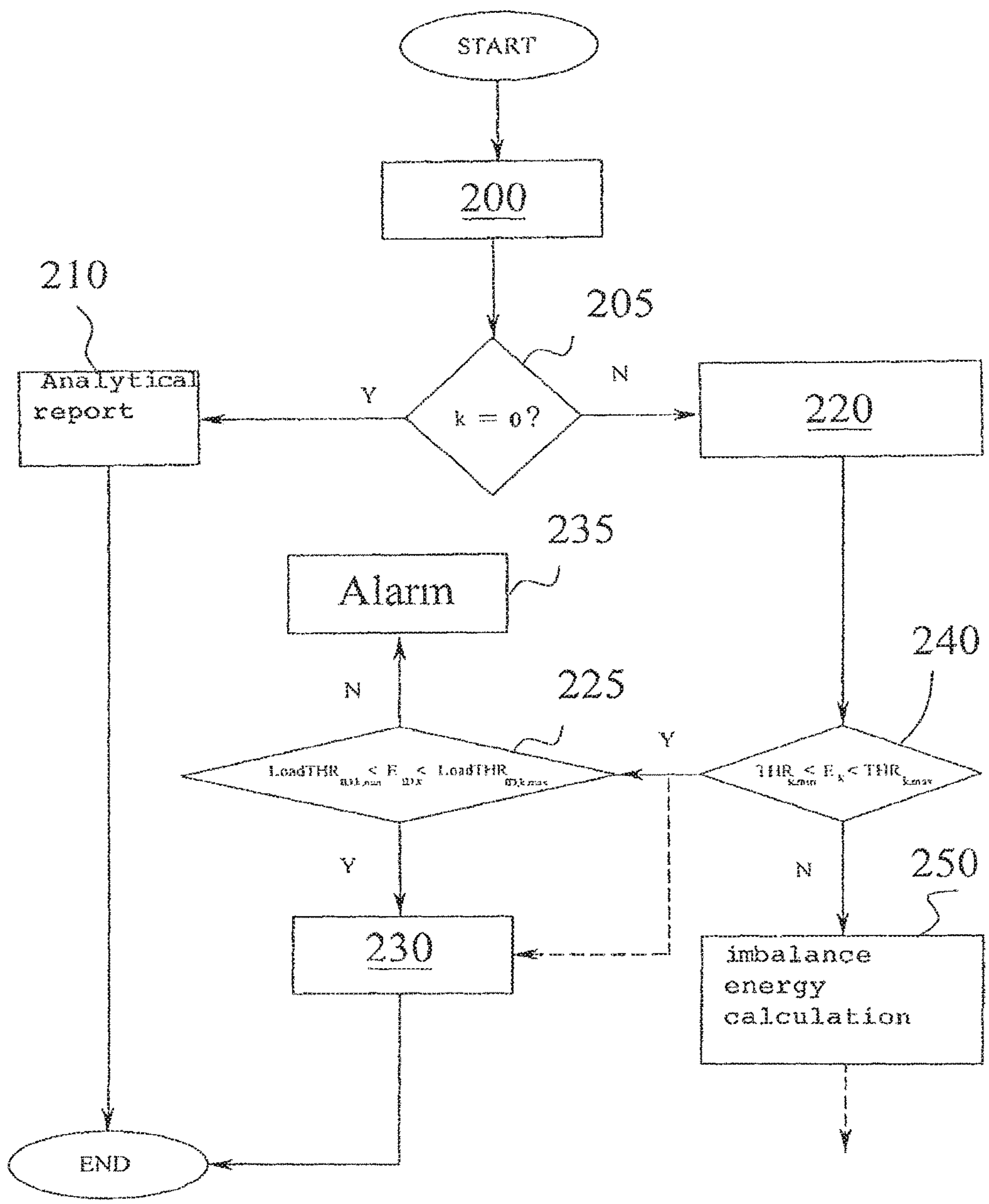
FIGS. 3-6 are block diagrams of various steps of the method of the invention.

As schematically represented in FIG. 3, the algorithm reads the present time and, if the time read indicates that it is in the first quarter of an hour (k=0 in block 205), on this occasion is only an analytical result of the progression of the consumptions in the preceding hour is made, retrieving the data from the database 57 (block 200). As the measurements are in terms of power, an estimate of the energy is made as an average of the measurements and is automatically converted into Watts per hour [Wh].

The analytical report of the first quarter of an hour is composed as follows (block 210).

Firstly, a calculation is made of the energy consumed $E_{(h-1)}$ in the previous hour h−1, where h is the present time, according to the formula:

$$E_{(h-1)}[\text{Wh}] = \frac{\sum_{i=1}^{4} \text{measurements}[\text{W}]_i}{4}$$

where h represents the present time and the i-th measurements (in Watts) are the measurements in the hourly intervals (h−1):15, (h−1):30, (h−1):45 and h:00 extracted from the database 57.

Further, the thresholds are retrieved from the database 57 with reference to the preceding hour:

$$\text{THR}_{(h-1)\gamma}\,[\text{Wh}]$$

where h is the present time and γ is the type of threshold [min,max,exp], i.e. minimum, maximum or expected. This is because every hour, or even every quarter of an hour, of the day can be associated to different comparison thresholds, for example on the basis of the various time bands.

The quantity of energy consumed in excess (or in defect) $Q_{(h-1)}$ with respect to the expected value thereof $THR_{(h-1)exp}$ is therefore given by the following formula:

$$Q_{(h-1)}\,[\text{Wh}] = E_{(h-1)} - \text{THR}_{(h-1)exp}$$

As mentioned above, in the first quarter of an hour of each hour, only an analytical report of the progression of the consumptions during the preceding hour is drawn up, and then the algorithm terminates.

If, on the other hand, the management algorithm of the imbalance is started up in a quarter of an hour k-th different from the first, it retrieves the data from the database 57 and effects a series of estimates to prepare the data for evaluation (block 220).

In the fifteen-minute periods following the first, the estimate of the absorbed energy $E_k$ from the start of the hour proportionately to the quarter of an hour is calculated using the following formula:

$$E_k\,[\text{Wh}] = \frac{k}{4} * \left( \frac{\sum_{i=1}^{k} \text{measurements}[\text{W}]_i}{k} \right)$$

where k is the number of the present quarter of an hour and measurements $[W_i]$ are the consumptions measured and extracted from the database 57.

Further, the comparison thresholds made proportionate to the quarter of an hour are retrieved from the database 57:

$$THR_{k\gamma}[\text{Wh}] = \frac{k}{4} * THR_{h,\gamma}[\text{Wh}]$$

Where h is the present time and γ is the type of threshold min,max,exp], i.e. minimum, maximum or expected.

Then a comparison (block 240) is made between the calculated consumption and the expected maximum $THR_{k,max}$ and minimum $THR_{k,min}$ thresholds of consumption, and if $$\text{THR}_{k,min} < E_k < \text{THR}_{k,max}$$

then the consumption is within the norm and the program terminates, signaling that no imbalance (block 230) is present.

If the control on the single loads is also active, the algorithm also evaluates whether the consumptions of the single loads $E_{ID,k}$ are respecting the maximum Load $THR_{ID,k,max}$ or minimum $LoadTHR_{ID,k,min}$ thresholds, confirming the forecasts:

$$\text{LoadTHR}_{ID,k,min} < E_{ID,k} < \text{LoadTHR}_{ID,k,max}$$

If this is true the program terminates, signaling in its system log that the gateway (block 230) is functioning correctly.

In the contrary case the program will signal the eventual anomaly in the consumptions (block 235) and at the user's discretion the anomaly can be corrected with the selection of actions available on the imbalanced load.

In particular, a strategy can be set up comprising at least an action to be actuated so as to vary the energy supplied to the single load which does not respect the minimum $LoadTHR_{ID,k,min}$ or maximum $LoadTHR_{ID,k,max}$ consumption load.

If the overall system has consumed more than expected, the subsequent step is the calculation of the quantity of energy to be recuperated or consumed for the h-th hour (block 250).

In this way the hourly excess can be controlled between the energy consumed and the expected value from the start of the hour:

$$\Delta_h\,[\mathrm{Wh}]=(E_k-\mathrm{THR}_{k,exp})*[(4-k)+1]$$

In this case, if $\Delta_h<0$ the system is below threshold and the consumption has to be increased; while if $\Delta_h>0$ the system is above threshold and the consumption must be reduced.

The term (4−k)+1 includes the hypothesis that the imbalance originates from the last quarter of an hour, i.e the preceding quarters of an hour have not produced different consumptions from those predicted, as if this were true they would have been evaluated before.

Figure 4:
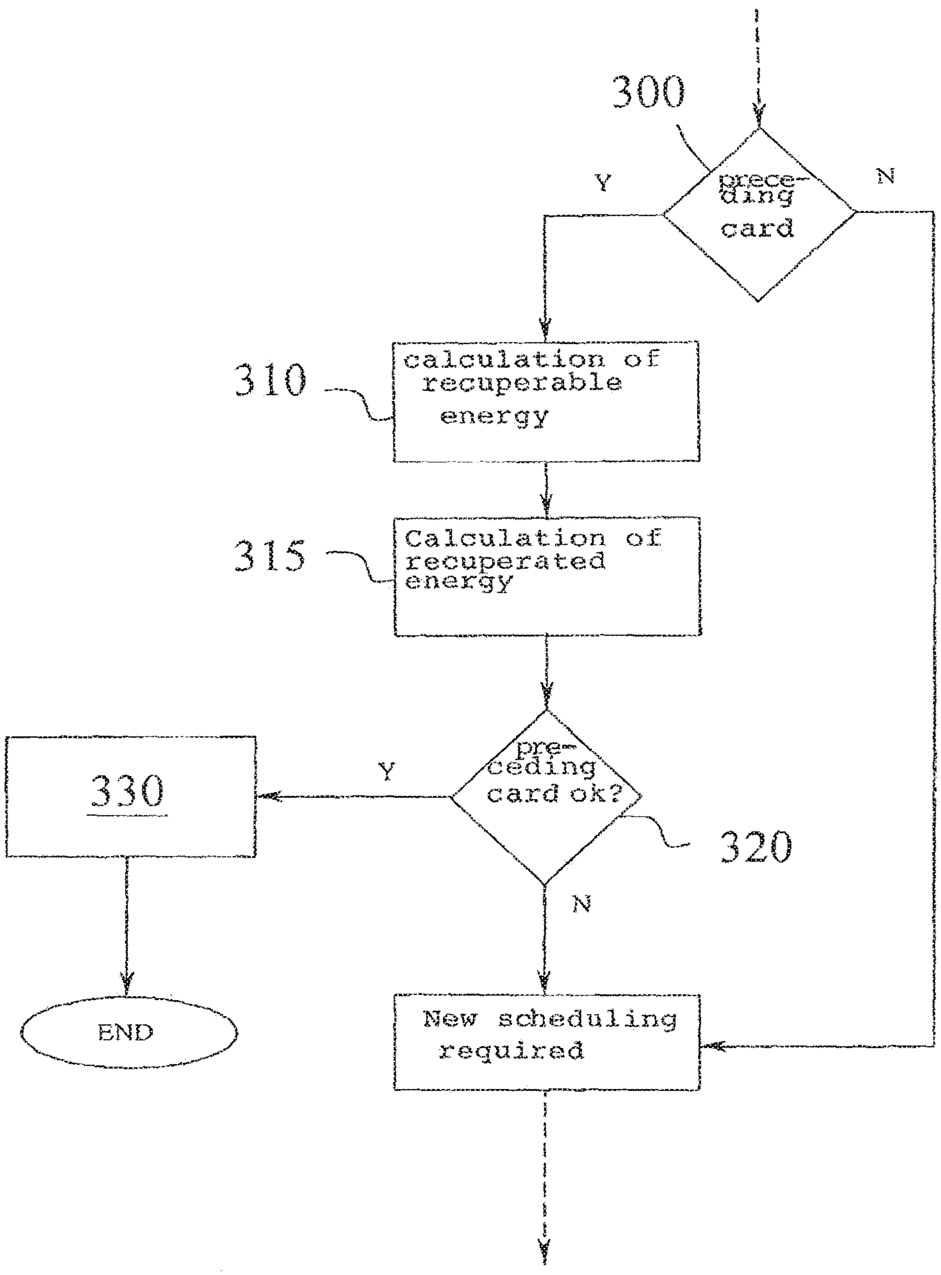

With reference to FIG. 4, it is verified whether the present scheduling is the effect of a preceding intervention of the balancing algorithm (block 300).

If this is true, the program analyses the progression of the scheduling previously undertaken and compares it with the linear forecast for the progression thereof, evaluated internally of a margin of tolerance, while if it is not true the strategies would never be accepted if they did not obtain compensation values identical to the forecast variation.

In this way the calculation of the recuperable energy $\Delta_{h,hypothesised}$ can be made every quarter of an hour (block 310) thanks to the balancing scheduling, where the formula:

$$\Delta_{h,hypothesised}[\mathrm{Wh}]=\frac{\left(\sum_{i=0}^{N} X_i * Vr_{i,j}\right)}{4-t}$$

represents the hypothesized variation, the ideal effect of the balancing scheduling started at quarter-hour t.

The calculation of the recuperated energy $\Delta_{h,measured}$ can also be made from the start of the scheduling of the balancing:

$$\Delta_{h,measured}[\mathrm{Wh}]=(measurement_{pre\text{-}actuation}[\mathrm{Wh}]-measurement_k[\mathrm{Wh}])*\frac{k-t}{4-t}$$

Where $measurement_{pre\text{-}actuation}$ indicates the measurement of the energy consumed before a previous scheduling, for example an emergency scheduling and $measurement_k$ indicates the measurement of the energy consumed after the n-th quarter of an hour from the quarter-hour t.

In this way a control is made on the basis of the theoretical forecast of the variable $\Delta_{h,hypothesised}$ if the effect of the scheduling is also positive in terms of the variable $\Delta_{h\_measured}$ which refers to a condition before the start of the emergency scheduling, i.e. derived from the balancing algorithm.

The variable $measurement_k$ depends instead on each single quarter-hour in such a way that the variable $\Delta_{h\_measured}$ indicates a measurement of the energy recuperated for the purposes of the energy balancing so as to return to an acceptable situation.

The recuperated energy $\Delta_{h,measured}$ is proportioned on the basis of the relation between how much time has passed since the start of the actuation of the emergency scheduling and for how much time it has been predicted.

At this point a calculation is made of whether the emergency scheduling is able to return the system to within the thresholds within an hour, at less than a margin of tolerance defined as margin_tolerance_recuperation (block 320) with the following formula:

$$\Delta_{h\_measured}-\Delta_{h,hypothesised}*(k-t)<\mathrm{margin\_tolerance\_recuperation}$$

If this condition is satisfied, i.e. if the scheduling produced previously is giving the hoped-for result, the program signals this condition and is halted (block 330).

In a contrary case, a new scheduling (block 340) is required.

The program is therefore restarted with the specification of producing a new scheduling of the remaining time and a compensating of the imbalance produced by the initial problem added to the energy non-compensated for during the preceding scheduling.

Figure 5:
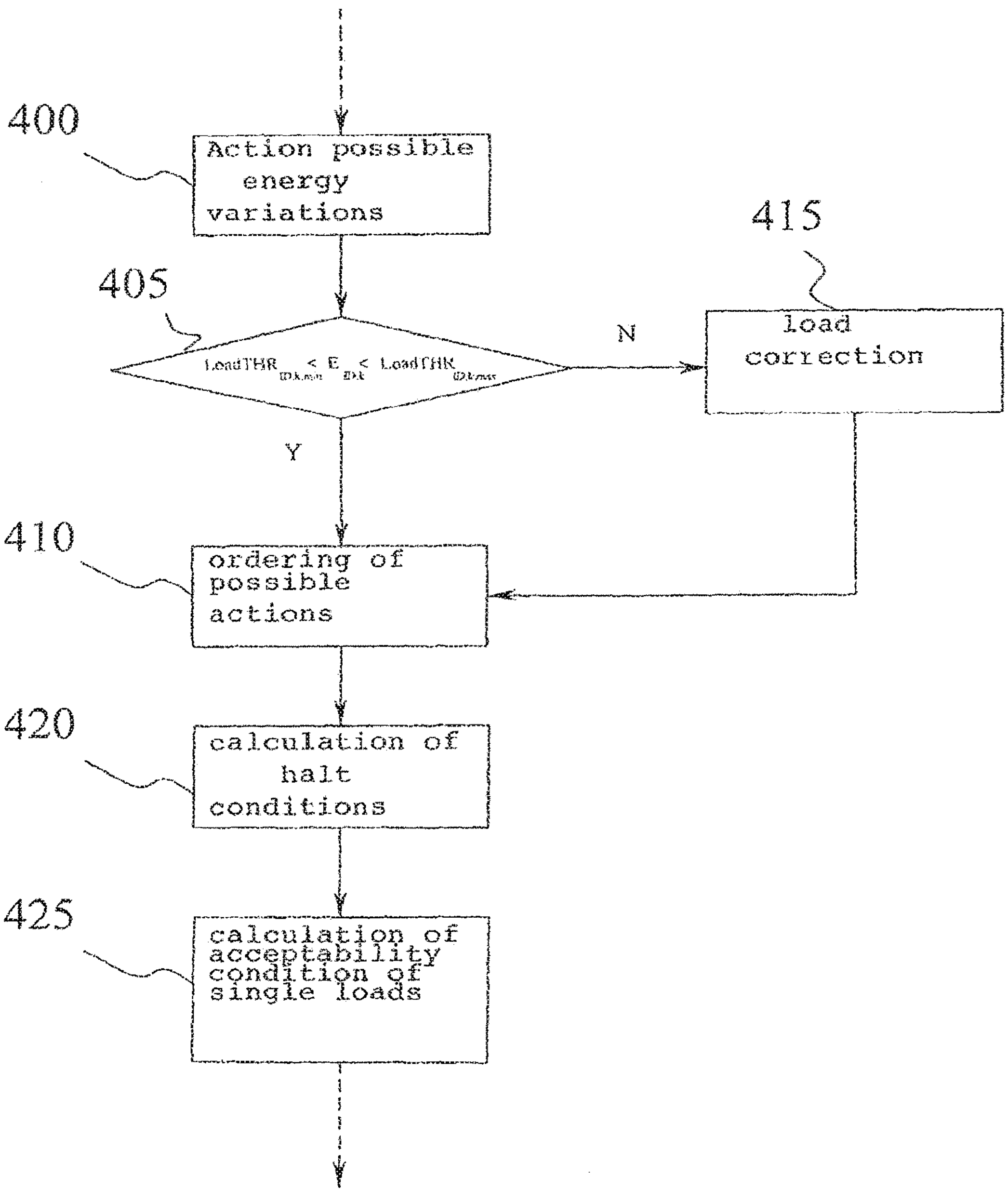

With reference to FIG. 5, the production of the new scheduling is done first by extracting from the database 57 the data received from the energy market operator or taken from other sources relating to the actions that can be carried out in the case of emergency available for that hour.

This operation is done by extracting from the database 57 the control actions usable and the relative available energy variations in relation to the present day and time and the associated loads:

$$Vr_{i,j}[\mathrm{Wh}]=Vr_{i,j}*\frac{j}{4}$$

Each i-th variation, with i belonging to N (number of valid and available variations) is proportioned with J=4−k, i.e. with respect to the number of quarter-hours remaining for actuation (block 400).

To limit the possibilities and calculation time of the program, these actions are filtered by removing those which taken alone would produce a greater effect than the imbalancing to be compensated.

Optionally the control of the consumption of the single loads (block 405) can be activated. If this control evidences that some loads are consuming differently to forecasts, the available actions associated to this load take on a greater importance with respect to the others (if the single load is enabled for control of consumption), and are then positioned in evidence among the actions for the return from imbalance.

With the aim of applying a Greedy-type heuristic, the list of actions is ordered decreasingly with respect to the absolute value of the obtainable variation, and in increasing order of priority so as to select first the strategies that have a minimum effect on comfort, but a greater effect on compensation (block 410).

On completion of this procedure, the program calculates a halt condition (block 420), expressed in terms of an energy margin which indicates whether the effects forecast by the selected strategy are acceptable so that the search for further actions can be concluded.

The acceptable out-of-balance quantity is a percentage threshold of the displacement between the expected value of the consumptions $THR_{exp}$ and the acceptable imbalance maximum and minimum thresholds $THR_{max}, THR_{min}$.

For the calculation of this halt condition to respect the thresholds every quarter-hour the following formula is used:

$$\text{margin}_h\ [\text{Wh}] = |THR_{min,max} - THR_{exp}| * \text{margin\_percent}$$

where h is the present time, $THR_{min,max}$ is min in the case in which $\Delta_k<0$ or max in the case in which $\Delta_k>0$ and margin_percent is a percentage value which identifies the nearing of the desired value to the expected value internally of the predefined thresholds.

If the variable margin_percent is at 0% the value of $\text{margin}_h$ is 0, so the desired value will tend to the expected value; if it is 100% the desired value will be within the closest threshold (max,min).

If the imbalance control for each single load is present, an internal acceptability condition is calculated at the single thresholds of consumption of the single loads at the quarter-hour (block 425), i.e:

$$\text{LoadMargin}\ [\text{Wh}] = \text{LoadTHR}_{min,max} - \text{LoadTHR}_{exp} * \text{LoadMarginPercent}$$

where h is the present time and $\text{LoadTHR}_{min,max}$ is min in the case in which $E_{ID,k}$ of the same load is lower than the minimum threshold and max in the case where $E_{ID,k}$ of the same load is greater than the maximum threshold and LoadMarginPercent is a percentage value identifying the nearing of the desired value to the expected value internally of the predefined thresholds.

If the variable LoadMarginPercent is 0% the $\text{margin}_h$ value is 0 and the desired value will tend to the expected value; if it is 100% the desired value will be within the nearer threshold (max,min).

When these preparations have been concluded, the program has all the data with which to find an acceptable strategy by iterating the following algorithm up to the satisfaction of the second constraint.

Figure 6:
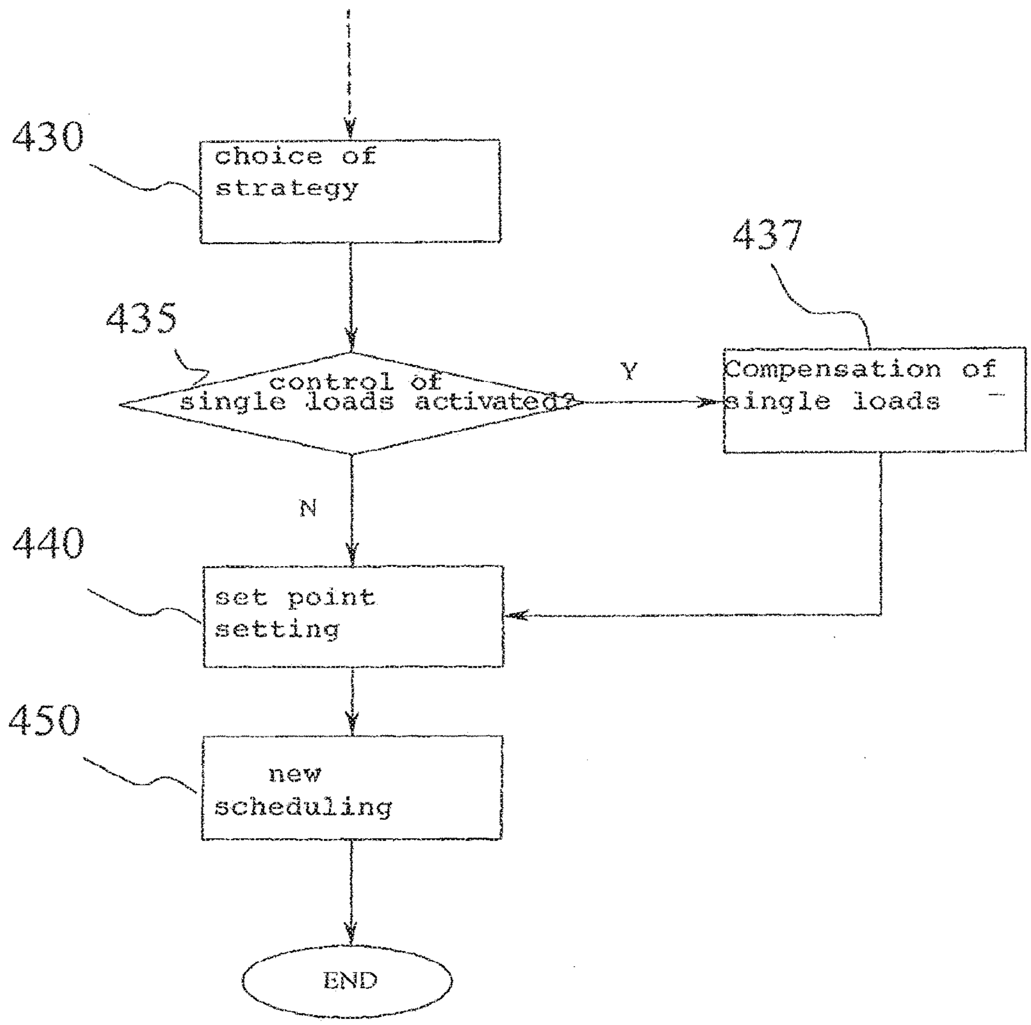

As illustrated in FIG. 6, the choice of the strategy (block 430) is made so as to fall within the thresholds, as a combination of the variations available, and to limit the imbalance.

The objective is therefore to minimize the impact on the system of the control actions, i.e. minimize the sum of the priorities of the actions undertaken:

$$\min \Sigma_{i=0}^{N} X_i * \text{Priority}[Vr_i]$$

by imposing the constraint that the sum of the energy variations selected is able to compensate the imbalance internally of the h-th hour:

$$|\Sigma_{i=0}^{N} X_i * Vr_{i,j}| \le |\Delta_h|$$

and $$\Delta_h + \Sigma_{i=0}^{N} X_i * Vr_{i,j} \le \text{margin}_h$$

The algorithm is summarized in a cycle which runs through the available actions and if these actions make a positive modification to the problem they are accepted by signaling the choice in vector $X_i$ (and prohibiting the use of other choices using the same load).

If the control of the single loads is activated (block 434), a further constraint is set on the consumptions of the single loads.

This means that in this case it is necessary to evaluate if the choices made also solve any imbalance of the single loads (block 437), i.e. that with:

$$\Delta_{ID,h}\ [\text{Wh}] = (E_{ID,i} - \text{LoadTHR}_{ID,k,exp}) * [(4-k)+1]$$

where the constraints on the choice of actions are:

$$|\Sigma_{i=0}^{N} X_{ID,i} * Vr_{ID,i,j}| \le |\Delta_{ID,h}|$$

$$\Delta_{ID,h} + \Sigma_{i=0}^{N} X_{ID,i} * Vr_{ID,i,j} \le \text{LoadMargin}_{ID,h}$$

If the chosen strategy does not solve these single imbalances a new strategy has to be composed; otherwise the algorithm proceeds.

The cycle concludes at the moment when the sum of the selected effect compensates the whole imbalance, with the margin of tolerance $\text{margin}_h$.

With the vector $X_i$ satisfying the specifications known, the program searches for the variables to set in the loads defined by the chosen actions in the vector (block 440).

The recuperated variables are set in the actuation of the main scheduling for the current quarter-hour, so that the results can be appreciated in the new measuring and analysis cycle of the following quarter-hour (block 450).

Figure 7:
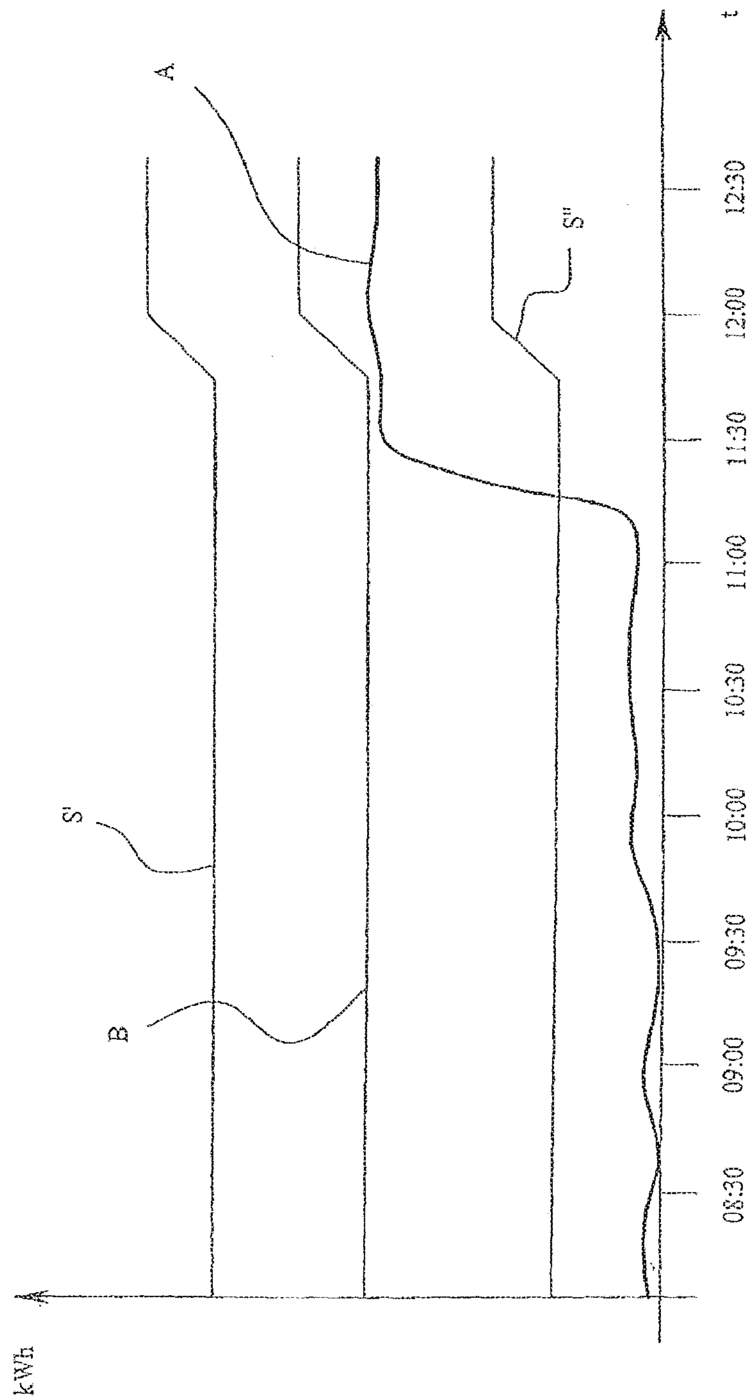
FIG. 7 illustrates an example of the functioning of the method of the invention.

In FIG. 7, for example, the functioning of the application of a chosen strategy of the balancing algorithm on the total power profile of the apparatuses is illustrated.

In FIG. 5 curve A indicates the interpolation of the points of the load power measurements, while curve B indicates the expected power value indicated by the market operator. The area comprised between the curves S',S" represents the acceptable imbalance thresholds in which the consumption of the system should be placed.

Before 11:00 the balancing algorithm is not active, and the system therefore operates only in terms of monitoring and scheduling.

When the imbalance management program is launched, the system is automatically brought into the admitted band and operates on the devices the scheduling of which was modifiable at that time.

In detail:

at 11:00 hours the balancing management algorithm is launched;

at 11:15 hours a difference between actual consumption and forecast consumption is evaluated; in this case the consumptions should be increased as the market operator has allocated more energy than what was requested;

the algorithm decides to modify the scheduling the devices so as to compensate the differences between the consumptions within an acceptable margin;

a few minutes after 11:15 the scheduling is modified and actuated, producing, in the 11:30 measurement, a correct increase in the consumption, which takes the curve into the area of tolerance;

the system proceeds with these consumption levels up to 12:00 when a new primary scheduling is launched, the scheduling produced by the imbalance is overwritten to change the setting values previous to the modification and apply the new scheduling.

Obviously modifications or improvements can be brought to the invention as it is described, dictated by contingent or particular motivations, without forsaking the scope of the invention as claimed in the following.

The invention claimed is:

1. A method for balancing electric consumption generated by a plurality of electric loads, the method comprising following steps:

estimating an absorbed energy ($E_k$) by the loads in a predetermined time interval, and if a value of the estimation of absorbed energy ($E_k$) by the loads is not within an interval defined by a minimum ($THR_{k,min}$) and a maximum ($THR_{k,max}$) consumption threshold, calculating a quantity of energy to be varied in accordance with a difference ($\Delta_h$) between the value of the estimation of the absorbed energy ($E_k$) and an expected value of energy ($THR_{k,exp}$), determining a strategy comprising at least an action ($Vr_i$) to be carried out to vary the energy supplied to the single loads, in order to reduce the difference ($\Delta_h$) between the estimated absorbed energy ($E_k$) and the expected value ($THR_{k,exp}$) thereof, and actuating a scheduling of electric consumption in accordance with a determined strategy, wherein the step of determining the variation strategy of the energy supplied to the loads comprises a step of determining available variations ($Vr_i$) of energy which can be supplied to the loads, and wherein the variations ($Vr_i$) of the energy supplied to the loads are made by selecting the loads to be varied so as to minimize an impact on the perceived comfort based on a following criterion:

$$\min \sum_{i=0}^{N} X_i * \text{Priority}[Vr_i]$$

where $X_i$ is a binary line vector [1,N] identifying whether a variation is used, Priority [$Vr_i$] is an index proportional to the impact the i-th variation $Vr_i$ has on the perceived comfort and N denotes the number of available actions.

2. The method of claim 1, wherein the available variations ($Vr_i$) of energy which can be supplied to the loads are ordered in a decreasing order with respect to the absolute value of variation and in an increasing order in accordance with an impact that the variations ($Vr_i$) have on perceived comfort.

3. The method of claim 1, wherein the variations ($Vr_{i,j}$) selected internally of each temporal interval j, satisfy following constraints:

$$\left| \sum_{i=0}^{N} X_i * Vr_{i,j} \right| \le |\Delta_h|$$

and $$\Delta_h + \sum_{i=0}^{N} X_i * Vr_{i,j} \le margin_h$$

where $\Delta_h$ indicates the difference between the estimated absorbed energy ($E_k$) and the expected value thereof ($THR_{k,exp}$) and $margin_h$ indicates the maximum acceptable discrepancy between the effects of the strategy and the energy to be recuperated or consumed.

4. The method of claim 1, wherein a verification step is included of the effects of a scheduling of electric consumption and, in a case where the verification has a negative outcome, a step of determining a new energy variation strategy of the energy supplied to the single loads.

5. The method of claim 4, wherein the verification step of the effects of a scheduling of electric consumption comprises calculating a difference between the effects of the scheduling in action and a theoretical forecast of the effects, where the verification has a negative outcome if the difference is greater than a margin of tolerance.

6. The method of claim 1, wherein a step of estimating the absorbed energy ($E_{ID,k}$) by each single load is included, and if the value of the estimation of the absorbed energy ($E_{ID,k}$) from each single load is not within a range defined by a minimum threshold ($LoadTHR_{ID,k,min}$) and a maximum threshold ($LoadTHR_{ID,k,max}$) of consumption for each load, a step is included of determining a strategy comprising at least an action to be performed so as to vary the energy supplied to the single load which does not respect the minimum threshold ($LoadTHR_{ID,k,min}$) or maximum threshold ($LoadTHR_{ID,k,max}$) of consumption.

7. A non-transitory computer readable medium for carrying out the method of claim 1.

8. A control apparatus comprising a control unit, a memory and the non-transitory computer-readable medium of claim 7 stored in the memory.

9. A device for balancing electric consumption generated by a plurality of electric loads, the device comprising:

means for estimating an absorbed energy ($E_k$) by the loads in a predetermined time interval, means for comparing the absorbed energy ($E_k$) by the loads with a minimum threshold ($THR_{k,min}$) and a maximum load ($THR_{k,max}$) of consumption, means for calculating a quantity of energy to be varied in accordance with a difference ($\Delta_h$) between the value of the estimation of the absorbed energy ($E_k$) and an expected value of energy ($THR_{k,exp}$), means for determining a strategy comprising at least an action ($Vr_i$) to be carried out to vary the energy supplied to the single loads, with an aim of reducing the difference ($\Delta_h$) between the estimated absorbed energy ($E_k$) and the expected value ($THR_{k,exp}$) thereof, and means for actuating a scheduling of electric consumption in accordance with a determined strategy, wherein the means for determining the variation strategy of the energy supplied to the loads are configured to determine available variations ($Vr_i$) of energy which can be supplied to the loads, and wherein the variations ($Vr_i$) of the energy supplied to the loads are made by selecting the loads to be varied so as to minimize an impact on the perceived comfort based on a following criterion:

$$\min \sum_{i=0}^{N} X_i * \text{Priority}[Vr_i]$$

where Xi is a binary line vector [1,N] identifying whether a variation is used, Priority [$Vr_i$] is an index proportional to the impact the i-th variation $Vr_i$ has on the perceived comfort and N denotes the number of available actions.

10. The device of claim 9, wherein the device comprises a power sub-system (45) able to operate on the distribution of the energy to the electric loads located downstream of a distribution point of the electric energy.

* * * * *